United States Patent
Rentsch et al.

(10) Patent No.: US 12,240,982 B2
(45) Date of Patent: *Mar. 4, 2025

(54) PROCESS FOR PREPARING A SURFACE-TREATED CALCIUM CARBONATE MATERIAL

(71) Applicant: OMYA INTERNATIONAL AG, Oftringen (CH)

(72) Inventors: Samuel Rentsch, Spiegel bei Bern (CH); Fabio Ippolito, Vordemwald (CH); Roman Marty, Allschwil (CH)

(73) Assignee: OMYA INTERNATIONAL AG, Oftringen (CH)

( * ) Notice: Subject to any disclaimer, the term of this patent is extended or adjusted under 35 U.S.C. 154(b) by 664 days.

This patent is subject to a terminal disclaimer.

(21) Appl. No.: 17/310,501

(22) PCT Filed: Feb. 24, 2020

(86) PCT No.: PCT/EP2020/054724
§ 371 (c)(1),
(2) Date: Aug. 6, 2021

(87) PCT Pub. No.: WO2020/173848
PCT Pub. Date: Sep. 3, 2020

(65) Prior Publication Data
US 2022/0162450 A1    May 26, 2022

(30) Foreign Application Priority Data

Feb. 26, 2019  (EP) .................... 19159398

(51) Int. Cl.
| C08K 9/04 | (2006.01) |
| C08J 3/22 | (2006.01) |
| C09C 1/02 | (2006.01) |
| C09C 3/00 | (2006.01) |
| C09C 3/04 | (2006.01) |
| C09C 3/08 | (2006.01) |

(52) U.S. Cl.
CPC .............. *C09C 1/021* (2013.01); *C08J 3/226* (2013.01); *C08K 9/04* (2013.01); *C09C 3/006* (2013.01); *C09C 3/041* (2013.01); *C09C 3/043* (2013.01); *C09C 3/08* (2013.01); *C01P 2004/61* (2013.01); *C01P 2004/62* (2013.01); *C08J 2323/00* (2013.01); *C08K 2201/005* (2013.01)

(58) Field of Classification Search
CPC ......... C09C 1/021; C09C 3/006; C09C 3/041; C09C 3/043; C09C 3/08; C08J 3/226; C08J 2323/00; C08K 9/04; C08K 2201/005; C08K 5/09; C08K 2003/265; C08K 5/06; C01P 2004/61; C01P 2004/62; C01P 2004/51; C01P 2004/52; C01P 2006/22; C01P 2006/82

USPC ........................................ 523/205
See application file for complete search history.

(56) References Cited

U.S. PATENT DOCUMENTS

| 5,278,248 | A | 1/1994 | Egraz et al. |
| 10,767,055 | B2* | 9/2020 | Blanchard ............... C09D 1/00 |
| 2004/0019148 | A1 | 1/2004 | Suau et al. |
| 2004/0097616 | A1 | 5/2004 | Hoppler et al. |
| 2004/0250970 | A1 | 12/2004 | Qiu et al. |
| 2007/0167531 | A1 | 7/2007 | Preston et al. |
| 2009/0298988 | A1* | 12/2009 | Jacquemet ............. B02C 23/06 524/425 |
| 2010/0025507 | A1 | 2/2010 | Buri |
| 2010/0258034 | A1* | 10/2010 | Reisacher ........... C09B 67/0095 106/400 |
| 2011/0092629 | A1 | 4/2011 | Mongoin et al. |
| 2012/0225988 | A1 | 9/2012 | Suau et al. |
| 2013/0197142 | A1 | 8/2013 | Buri et al. |
| 2017/0009076 | A1* | 1/2017 | Rentsch ................... C08K 3/26 |
| 2022/0135765 | A1* | 5/2022 | Rentsch ................... C08K 3/26 524/425 |
| 2022/0145083 | A1* | 5/2022 | Rentsch ................ D21H 19/00 |

FOREIGN PATENT DOCUMENTS

| EP | 2194103 A1 | 6/2010 |
| EP | 2199348 A1 | 6/2010 |
| EP | 2371766 A1 | 10/2011 |
| EP | 2390285 A1 | 11/2011 |
| EP | 2447213 A1 | 5/2012 |
| EP | 2524898 A1 | 11/2012 |
| EP | 2770017 A1 | 8/2014 |
| EP | 2910609 A1 | 8/2015 |
| EP | 3042878 A1 | 7/2016 |
| WO | 00/20336 A1 | 4/2000 |

(Continued)

OTHER PUBLICATIONS

International Search Report from PCT/EP2020/054724, mailed Mar. 26, 2020, 4 pages.
Written Opinion from PCT/EP2020/054724, mailed Mar. 26, 2020, 15 pages.
International Search Report from PCT/EP2020/054728, mailed Mar. 13, 2020, 5 pages.
Written Opinion from PCT/EP2020/054728, mailed Mar. 13, 2020, 6 pages.
International Search Report from PCT/EP2020/054730, mailed Mar. 13, 2020, 4 pages.
Written Opinion from PCT/EP2020/054730, mailed Mar. 13, 2020, 6 pages.

(Continued)

*Primary Examiner* — Hannah J Pak
(74) *Attorney, Agent, or Firm* — ALGM LLP; Harry J. Guttman

(57) ABSTRACT

The present invention relates to a process for preparing a surface treated calcium carbonate-comprising material, a surface treated calcium carbonate-comprising material obtained by the process, an article comprising the surface treated calcium carbonate-comprising material, a polymer composition and the use of the surface treated calcium carbonate-comprising material in a polymer composition.

26 Claims, No Drawings

(56) References Cited

FOREIGN PATENT DOCUMENTS

| | | |
|---|---|---|
| WO | 02/055596 A1 | 7/2002 |
| WO | 03/066692 A1 | 8/2003 |
| WO | 2005/075353 A1 | 8/2005 |
| WO | 2010/030579 A1 | 3/2010 |
| WO | 2016/023937 A1 | 2/2016 |

OTHER PUBLICATIONS

Restriction Requirement in U.S. Appl. No. 17/310,240 dated Feb. 28, 2024, 8 pages.
Response to Restriction Requirement in U.S. Appl. No. 17/310,240 dated Apr. 15, 2024, 4 pages.
NonFinal Office action in U.S. Appl. No. 17/310,240 dated Jun. 6, 2024, 14 pages.
Response to NonFinal Office action in U.S. Appl. No. 17/310,240 dated Aug. 21, 2024, 14 pages.
Final Office action in U.S. Appl. No. 17/310,240 dated Sep. 10, 2024, 15 pages.
Restriction Requirement in U.S. Appl. No. 17/310,530 dated Feb. 12, 2024, 8 pages.
Response to Restriction Requirement in U.S. Appl. No. 17/310,530 dated Feb. 22, 2024, 4 pages.
NonFinal Office action in U.S. Appl. No. 17/310,530 dated Jun. 28, 2024, 16 pages.
Response to NonFinal Office action in U.S. Appl. No. 17/310,530 dated Oct. 11, 2024, 15 pages.
Response to Final Office action in U.S. Appl. No. 17/310,240 dated Nov. 27, 2024, 13 pages.

\* cited by examiner

PROCESS FOR PREPARING A SURFACE-TREATED CALCIUM CARBONATE MATERIAL

CROSS-REFERENCE TO RELATED APPLICATIONS

This application is a National Stage Entry of International Application No. PCT/EP2020/054724 filed Feb. 24, 2020, entitled "PROCESS FOR PREPARING A SURFACE-TREATED CALCIUM CARBONATE MATERIAL", and which claims priority to EP Application Serial No. 19159398.7 filed Feb. 26, 2019 entitled "PROCESS FOR PREPARING A SURFACE-TREATED CALCIUM CARBONATE MATERIAL."

The present invention relates to a process for preparing a surface treated calcium carbonate-comprising material, a surface treated calcium carbonate-comprising material obtained by the process, an article comprising the surface treated calcium carbonate-comprising material, a polymer composition and the use of the surface treated calcium carbonate-comprising material in a polymer composition.

The invention in particular concerns the manufacture of plastics and in particular polymer resins such as polyolefin resins. Today part of the costly resins are replaced regularly with less expensive fillers and/or pigment materials in order to reduce costs, while at the same time trying to improve mechanical and/or optical properties of the unfilled material.

The amounts of fillers present in thermoplastic polymers such as polyolefins are generally in the range from about 1% by weight to about 90% by weight. Such amounts generally allow for a normal processing of the thermoplastic polymers.

Said fillers are frequently selected from natural or synthetic calcium carbonate, or dolomites, and are incorporated in the polymer matrix directly, in the form of a compound, a dry blend, a masterbatch, or granulates.

Frequently mineral material is mixed with grinding aid agents in order to allow for wet grinding at high solids contents. Current prior art tries to provide solutions to overcome the problem of agglomerates. Fine mineral materials are made into masterbatches for easier dosage and better dispersion into the polymer matrix. In some applications the mineral filler are optionally surface treated.

WO0020336 refers to an ultrafine natural calcium carbonate, optionally treated with one or several fatty acids or one or several salts or mixtures thereof, and its use as a rheology regulator for polymer compositions. The specific surface area is 14 $m^2$/g to 30 $m^2$/g measured according to the BET method to ISO Standard 4652.

WO03066692 refers to a binding agent used in a masterbatch to allow re-dispersion of mineral material in thermoplastic resins.

WO2005075353 refers to a natural particulate carbonate, wherein the grinding aid agent employed during wet grinding is minimized or removed at a later stage by washing, and subsequent dewatering leads to a product with reduced surface moisture content at around 0.2 wt.-%. Remainders of grinding aid agent chemicals are not greater than 0.05 wt.-% based on the dry weight of the carbonate. Where the carbonate is to be surface coated with a hydrophobizing surface treatment agent, a second heating step is used; the second heating step may be applied before and/or during the surface treatment step. Surface treatment agents may comprise an aliphatic carboxylic acid.

WO2010030579 refers to stearic acid treated calcium carbonate having low or no detectable free stearic acid. The method for treating calcium carbonate includes the combination of calcium carbonate, water and stearic acid, wherein the amount of water is at least 0.1% by weight relative to the total weight.

US2004097616 refers to a treated particulate calcium carbonate. Said treatment being carried out in two steps. The first treatment (pre-treatment) step comprises treatment with at least one polydialkylsiloxane and a second step comprising a treatment by at least one fatty acid containing more than 10 carbon atoms, the two steps being able to be carried out simultaneously.

However, such materials, prepared by the methods known in the art comprising grinding aid agents on the basis of polyacrylic acid typically have an increased moisture pick-up after spray drying of the corresponding aqueous suspension.

In view of the above, there is still a need in the art for a process to prepare a surface treated calcium carbonate-comprising material such that it is sufficiently hydrophobic for applications in polymer compositions and having a low moisture pick up susceptibility such that it is lower than that of the same material prepared by a process using a grinding aid agent of the prior art.

Thus, there is still a need for providing a process which addresses the foregoing technical problems described and especially allows for improving the surface characteristics of a resulting surface treated calcium carbonate-comprising material.

Accordingly, it is an objective of the present invention to provide a process for preparing a surface treated calcium carbonate-comprising material having improved surface characteristics, and especially a low moisture pick-up susceptibility. A further objective is to provide a process for preparing a surface treated calcium carbonate-comprising material featuring a sufficient hydrophobicity for polymer applications. A still further objective is to provide a process for preparing a surface treated calcium carbonate-comprising material which can be carried out in a simple way. Further objectives can be gathered from the following description of the invention.

The foregoing and other objectives are solved by the subject-matter as defined herein in claim 1.

Advantageous embodiments of the inventive process are defined in the corresponding sub-claims.

According to one aspect of the present application, a process for preparing a surface treated calcium carbonate-comprising material for use in polymer applications s provided. The process comprises the steps of:
a) providing water;
b) providing at least one calcium carbonate-comprising material;
c) providing at least one copolymer (P) used as grinding aid agent prepared from the polymerisation reaction of
at least one compound selected from acrylic acid, methacrylic acid, salts thereof, and combinations thereof, and
at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof,
the copolymer having
i) an average molecular weight (Mw) as measured by gel permeation chromatography (GPC) from 4 000 to 20 000 g/mol, and ii) a Polydispersity Index (PI) as measured by gel permeation chromatography (GPC) of between 1.5 and 4.0, and iii) carboxylic acid functions that are totally or partially neutralized
by $Na^+$ in an amount of 70 mol-% and
by $Na^+$, $K^+$, $Li^+$ or combinations thereof in an additional amount from 10 to 30 mol-%, d) forming an aqueous suspension by mixing the water of step a), the at least one calcium carbonate-comprising material of step b) and the at least one copolymer of step c);

e) wet grinding the at least one calcium carbonate-comprising material in the aqueous suspension of step d) in the presence of the at least one copolymer in at least one wet grinding step until the at least one calcium carbonate-comprising material has a weight median particle size $d_{50}$ from 0.1 μm to 3 μm as determined by the sedimentation method, and f) up-concentrating or dewatering the aqueous suspension obtained in step e) to achieve a higher solids content than that of step e) and the solids content achieved in step f) is at least 70 wt.-%, based on the total weight of the aqueous suspension, and g) drying the aqueous suspension obtained in step f) to achieve a calcium carbonate-comprising material having a moisture content of ≤0.5 wt.-%, based on the total dry weight of the calcium carbonate-comprising material, preferably by drying means selected from the group comprising atomizing, spray drying, drying in a rotational oven, drying in a pond, jet-drying, fluid bed drying, freeze drying, fluidized spray drying, or fountain nozzle drying, more preferably by spray drying, and h) surface treating the calcium carbonate-comprising material obtained in step g) with at least one hydrophobizing agent.

According to one embodiment, step d) of forming an aqueous suspension is carried out by i. mixing simultaneously the water of step a), the at least one calcium carbonate-comprising material of step b) and the at least one copolymer of step c); or ii. mixing first the water of step a) with the at least one calcium carbonate-comprising material of step b) and then adding the at least one copolymer of step c) into the mixture; or iii. mixing first the water of step a) with the at least one copolymer of step c) and then adding the at least one calcium carbonate-comprising material of step b) into the mixture; or iv. mixing first the at least one copolymer of step c) with the at least one calcium carbonate-comprising material of step b) and then adding the water of step a) into the mixture;

According to another embodiment, the aqueous suspension of step d) and/or e) has a solids content in the range from 40 to 70 wt.-%, preferably from 50 to 70 wt.-%, based on the total weight of the aqueous suspension.

According to yet another embodiment, 100% of the neutralized carboxylic acid functions of the copolymer of step c) are neutralized by $Na^+$.

According to one embodiment, the copolymer (P) of step c) has an average molecular weight (Mw) as measured by gel permeation chromatography (GPC) from 4 000 to 18 000 g/mol, preferably from 10 000 to 16 000 g/mol.

According to another embodiment, wet grinding step e) is carried out in that the copolymer of step c) is present in an amount ranging from 500 to 5 000 ppm, based on the total dry weight of the calcium carbonate-comprising material, preferably from 800 to 4 000 ppm, more preferably from 1 000 to 3 000 ppm, and most preferably from 1 200 to 2 000 ppm.

According to yet another embodiment, the up-concentration or dewatering in step f) is carried out such as to achieve a higher solids content than that of step e) and the solids content achieved in step f) is at least 72 wt.-%, preferably of at least 75 wt.-% and most preferably in the range from 75 to 81 wt.-%, based on the total weight of the aqueous suspension.

According to one embodiment, the up-concentration or dewatering in step f) is carried out by mechanical- and/or thermal up-concentration and/or combinations thereof, preferably by thermal up-concentration, optionally in combination with vacuum.

According to another embodiment, the calcium carbonate-comprising material in the aqueous suspension obtained in step e) and/or step f) has a weight median particle size $d_{50}$ from 0.1 μm to 2.8 μm, preferably from 0.4 μm to 2.6 μm, more preferably from 0.6 μm to 2.5 μm as determined by the sedimentation method.

According to yet another embodiment, the hydrophobizing agent is selected from i) an aliphatic carboxylic acid having a total amount of carbon atoms from $C_4$ to $C_{24}$, or, j) a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, and k) a phosphoric acid ester blend of one or more phosphoric acid mono-ester and one or more phosphoric acid di-ester, and l) polyhydrogensiloxane, an inert silicone oil, preferably polydimethylsiloxane, and mixtures thereof, and m) an aliphatic aldehyde selected from aliphatic aldehydes having 6 to 14 carbon atoms, preferably from aliphatic aldehydes having 6 to 12 carbon atoms and more preferably from aliphatic aldehydes having 8 or 9 carbon atoms, even more preferably the aliphatic aldehyde is selected from the group consisting of hexanal, heptanal, octanal, nonanal, decanal, undecanal, dodecanal, tridecanal, butadecanal and mixtures thereof.

According to one embodiment, the surface treated calcium carbonate-comprising material has a moisture pick-up equal or inferior to 0.26 mg/m², preferably equal or inferior to 0.21 mg/m² at a temperature of 23° C. (±2° C.).

According to another aspect, a surface treated calcium carbonate-comprising material as obtained by a process as defined herein is provided comprising a treatment layer on the surface of the material comprising at least one hydrophobizing agent and reaction products thereof.

According to a further aspect, an article, preferably a polyolefin polymer product, is provided comprising the surface treated calcium carbonate-comprising material as defined herein.

According to one embodiment, the surface treated calcium carbonate-comprising material is present in an amount from 1 to 90 wt.-% preferably from 3 to 70 wt.-%, still more preferably from 6 wt.-% to 65 wt.-%, and still more preferably from 7 to 60 wt.-%.

According to an even further aspect, a polymer composition, preferably a masterbatch, is provided comprising the surface treated calcium carbonate-comprising material as defined herein in an amount of from 50 to 85 wt.-%, preferably from 60 to 85 wt.-% and more preferably from 70 to 80 wt.-%, based on the total weight of the polymer composition.

According to another aspect, the use of the surface treated calcium carbonate-comprising material as defined herein in a polymer composition, in particular polyolefin polymer composition, is provided.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

In the following details and preferred embodiments of the inventive process will be set out in more details. It is to be understood that these technical details and embodiments also apply to the inventive products as well as to their use.

Process Step a)

According to process step a), water is provided. For the purpose of the present invention, any type of water can be used in order to form the aqueous suspension in step d).

According to one embodiment the water is tap water, deionized water, process water or a mixture thereof. Preferably, the water provided in step a) is tap water.

Process Step b)

According to step b) of the process of the present invention, a calcium carbonate-comprising material is provided. In general, said calcium carbonate-comprising material can be any calcium carbonate source and can be of natural or synthetic origin.

In some embodiments of the process according to the present invention, the calcium carbonate-comprising material provided in step b) is selected from natural calcium carbonate sources, preferably containing from 80 to 100 wt.-% of calcium carbonate, based on the total weight of said calcium carbonate-comprising material.

According to another embodiment, the calcium carbonate-comprising material provided in step b) is selected from the group consisting of marble, limestone, chalk, dolomite, and mixtures thereof.

Preferably, the calcium carbonate-comprising material provided in step b) is selected from the group consisting of marble, limestone, chalk, and mixtures thereof.

In one embodiment, the calcium carbonate-comprising material provided in step b) is marble.

In cases where the calcium carbonate is of synthetic origin, the calcium carbonate-comprising material can be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP2447213, EP2524898, or EP2371766.

Suitably, the calcium carbonate-comprising material of step b) is provided as a solid material being in particulate form. In this respect, the calcium carbonate-comprising material provided in step b) can have any particle size distribution allowing the material to be subjected to a wet grinding step. Therefore, the calcium carbonate-comprising material can be provided as a comminuted material, for example, in crushed or preground form.

For example, the calcium carbonate-comprising material of step b) has been processed through a crushing, wet and/or dry grinding, screening and/or fractionating, for example by a cyclone or classifier. In one embodiment, the calcium carbonate-comprising material of step b) has been processed through a crushing, grinding, screening and fractionating, for example by a cyclone or classifier.

It is to be noted that a crushing stage is distinguished from a grinding stage in that crushing is an essentially coarse combination, generally leading to fragments being obtained with an average diameter of the order of one centimeter, or one millimeter, whereas grinding consists of a fragmentation operation leading to a substantially finer product than the crushed product, of an average diameter of 0.5 to 600 microns.

In one embodiment, the calcium carbonate-comprising material of step b) has been obtained by dry grinding. According to another embodiment of the present invention, the calcium carbonate-comprising material of step b) has obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising material of step b) comprises wet ground calcium carbonate-comprising particles, the grinding step may be performed under conditions such that autogenous grinding takes place and/or by horizontal ball milling, and/or other such processes known to the skilled man. The wet processed calcium carbonate-comprising material thus obtained may be washed and dewatered by well known processes, e.g. by flocculation, filtration or forced evaporation prior to drying. The subsequent step of drying may be carried out in a single step such as spray drying, or in at least two steps. It is also common that such calcium carbonate-comprising material undergo a beneficiation step (such as a flotation, bleaching or magnetic separation step) to remove impurities. Such processes for processing calcium carbonate-comprising materials for adjusting and obtaining specific particle sizes are well known to the skilled person, e.g. from US2010025507 A1.

According to one embodiment, the calcium carbonate-comprising material provided in step b) has a weight median particle size $d_{50}$ ranging from 0.5 to 600 μm, preferably from 0.8 to 200 μm, and more preferably from 1 to 100 μm.

Additionally or alternatively, the calcium carbonate-comprising material provided in step b) has a particle size $d_{90}$ ranging from 5 to 1 000 µm, preferably from 10 to 500 µm, and more preferably from 20 to 200 µm.

Additionally or alternatively, the calcium carbonate-comprising material provided in step b) has a particle size $d_{20}$ ranging from 0.1 to 200 µm, preferably from 0.4 to 100 µm, and more preferably from 0.8 to 50 µm.

Thus, the calcium carbonate-comprising material provided in step b) preferably has
- a particle size $d_{90}$ ranging from 5 to 1 000 µm, preferably from 10 to 500 µm, and more preferably from 20 to 200 µm, and
- a weight median particle size $d_{50}$ ranging from 0.5 to 600 µm, preferably from 0.8 to 200 µm, and more preferably from 1 to 100 µm.

Alternatively, the calcium carbonate-comprising material provided in step b) has
- a weight median particle size $d_{50}$ ranging from 0.5 to 600 µm, preferably from 0.8 to 200 µm, and more preferably from 1 to 100 µm, and
- a particle size $d_{20}$ ranging from 0.1 to 200 µm, preferably from 0.4 to 100 µm, and more preferably from 0.8 to 50 µm.

In one embodiment, the calcium carbonate-comprising material provided in step b) has
- a particle size $d_{90}$ ranging from 5 to 1 000 µm, preferably from 10 to 500 µm, and more preferably from 20 to 200 µm, and
- a weight median particle size $d_{50}$ ranging from 0.5 to 600 µm, preferably from 0.8 to 200 µm, and more preferably from 1 to 100 µm, and
- a particle size $d_{20}$ ranging from 0.1 to 200 µm, preferably from 0.4 to 100 µm, and more preferably from 0.8 to 50 µm.

Process Step c)

According to step c) of the process of the present invention, at least one copolymer (P) is provided, the at least one copolymer (P) is used as grinding aid agent prepared from the polymerisation reaction of
- at least one compound selected from acrylic acid, methacrylic acid, salts thereof, and combinations thereof, and
- at least one non-ionic compound selected from hydroxyethylacrylate, hydroxypropylacrylate, hydroxyethylmethacrylate, hydroxpropylmethacrylate, $C_1$-$C_5$ esters of acrylic acid, $C_1$-$C_5$ esters of methacrylic acid, and combinations thereof.

It is appreciated that the at least one homopolymer (P) of step c) is used as grinding aid agent in the process of the present invention.

The inventors surprisingly found out that it is of particular advantage that the at least one copolymer (P) has i) an average molecular weight (Mw) as measured by gel permeation chromatography (GPC) from 4 000 to 20 000 g/mol, and ii) a Polydispersity Index (PI) as measured with gel permeation chromatography (GPC) of between 1.5 and 4.0, and iii) carboxylic acid functions that are totally or partially neutralized
- by $Na^+$ in an amount of 70 mol-% and
- by $Na^+$, $K^+$, $Li^+$ or combinations thereof in an additional amount from 10 to 30 mol-%.

The use of such a copolymer as grinding aid agent in a process for preparing a surface treated calcium carbonate-comprising material results in a material having improved surface characteristics, and especially a low moisture pick-up susceptibility, as well as a sufficient hydrophobicity for polymer applications.

It is appreciated that the expression "at least one" copolymer (P) means that the copolymer (P) comprises, preferably consists of, one or more kinds of copolymer(s) (P). According to the invention, homopolymers may also be present in addition to such copolymers.

Accordingly, it should be noted that the at least one copolymer (P) may be one kind of copolymer (P). Alternatively, the at least one copolymer (P) may be a mixture of two or more kinds of copolymers (P). For example, the at least one copolymer (P) may be a mixture of two or three kinds of copolymers (P), like two kinds of copolymers (P).

In one embodiment of the present invention, the at least one copolymer (P) comprises, preferably consists of, one kind of copolymer (P).

It is one requirement of the present invention that the copolymer (P) is obtained from the polymerisation reaction of
- at least one compound selected from acrylic acid, methacrylic acid, salts thereof, and combinations thereof, and
- at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof.

For example, the copolymer (P) is obtained from the polymerisation reaction of
- acrylic acid or salts thereof, and
- at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof.

Preferably, the copolymer (P) is obtained from the polymerisation reaction of
- acrylic acid or salts thereof, and
- hydroxyethylacrylate, hydroxypropylacrylate, or $C_1$-$C_5$ esters of acrylic acid.

It is appreciated that the $C_1$-$C_5$ ester of acrylic acid and/or $C_1$-$C_5$ ester of methacrylic acid is/are preferably selected from alkyl ester of acrylic acid and/or alkyl ester of methacrylic acid. For example, the $C_1$-$C_5$ ester of acrylic acid is selected from $C_1$-$C_5$ alkyl ester of acrylic acid.

Preferably, the copolymer (P) is obtained from the polymerisation reaction of
- acrylic acid or salts thereof, and
- hydroxyethylacrylate or hydroxypropylacrylate.

In a more preferred embodiment, the copolymer (P) is obtained from the polymerisation reaction of
- acrylic acid or salts thereof, and
- hydroxypropylacrylate.

In one embodiment of the present invention, the monomer units derivable from the at least one compound selected from acrylic acid, methacrylic acid, salts thereof, and combinations thereof, constitutes the main part of the copolymer, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the copolymer (P). The amount of monomer units derived from the at least one non-ionic compound selected from esters of acrylic acid, esters of methacrylic acid, salts thereof, and combinations thereof in the copolymer (P), is in the range of 1 to 40 wt.-%, more preferably in the range of 1 to 30 wt.-% and most preferably in the range of 1 to 20 wt.-%, based on the total weight of the copolymer (P).

It has been further found out that the advantageous results are especially achieved if the copolymer (P) is a copolymer wherein the carboxylic acid functions are totally or partially neutralized
  by $Na^+$ in an amount of 70 mol-% and
  by $Na^+$, $K^+$, $Li^+$ or combinations thereof in an additional amount from 10 to 30 mol-%.

It is preferred that the carboxylic acid functions of the copolymer (P) are totally or partially neutralized in an amount from 80 to 100 mol-%. For example, the carboxylic acid functions of the copolymer (P) are totally or partially neutralized in an amount from 85 to 100 mol-%.

For example, the carboxylic acid functions of the copolymer (P) are partially neutralized in an amount from 85 to 95 mol-%. In this embodiment, the copolymer (P) thus contains free carboxylic acid functions in an amount from 5 to 15 mol-%. Preferably, the carboxylic acid functions of the copolymer (P) are partially neutralized in an amount from 88 to 92 mol-%, i.e. the copolymer (P) contains free carboxylic acid functions in an amount from 8 to 12 mol-%.

Alternatively, the carboxylic acid functions of the copolymer (P) are totally neutralized, e.g. in an amount of 100 mol-%. In this embodiment, the copolymer (P) does not contain free carboxylic acid functions.

Preferably, the carboxylic acid functions of the copolymer (P) are totally neutralized.

In particular, it is advantageous if the carboxylic acid functions of the copolymer (P) are totally or partially neutralized by a monovalent cation such as $Na^+$, $K^+$, $Li^+$ or combinations thereof.

It is appreciated that such copolymers (P) may be prepared by any process known to the skilled person. That is to say, the copolymer (P) can be prepared from the corresponding polymerisation reaction, i.e. of at least one compound selected from acrylic acid, methacrylic acid, and combinations thereof, and at least one non-ionic compound selected from esters of acrylic acid, esters of methacrylic acid, and combinations thereof, and the subsequent partial or full neutralization of the carboxylic acid functions. Alternatively, the copolymer (P) is prepared from the polymerisation reaction of the corresponding salt(s) of the at least one compound selected from acrylic acid, methacrylic acid, and combinations thereof, and the corresponding salt(s) of the at least one non-ionic compound selected from $C_1$-$C_5$ esters of acrylic acid, $C_1$-$C_5$ esters of methacrylic acid, and combinations thereof resulting in a copolymer (P) featuring a partial or full neutralization of the carboxylic acid functions.

Unless indicated otherwise, the term "partially neutralized" as used herein indicates that the copolymer (P) still contains unneutralized carboxylic acid functions, i.e. free carboxylic acid functions are present. In contrast thereto, the term "fully neutralized" indicates that any carboxylic acid function present in the copolymer (P) is neutralized, i.e. no free carboxylic acid functions are present. The methods of partially or fully replacing protons of carboxylic acid functions by monovalent cations are well known as well as the methods to determine whether a polymer is partially or fully neutralized.

Accordingly, the carboxylic acid functions are totally or partially neutralized by $Na^+$ in an amount of 70 mol-% and by $Na^+$, $K^+$, $Li^+$ or combinations thereof in an additional amount from 10 to 30 mol-%. If not otherwise indicated the amount of $Na^+$ and optionally $K^+$ and/or $Li^+$ is based on the total amount of carboxylic acid functions in the copolymer (P).

Accordingly, the carboxylic acid functions are totally or partially neutralized by $Na^+$, $K^+$, $Li^+$ or combinations thereof in an amount from 80 to 100 mol-%. Preferably, the carboxylic acid functions of the copolymer (P) are totally or partially neutralized by $Na^+$, $K^+$, $Li^+$ or combinations thereof in an amount from 85 to 100 mol-%. If not otherwise indicated the amount of $Na^+$, $K^+$, $Li^+$ or combinations thereof is based on the total amount of carboxylic acid functions in the copolymer (P).

In one embodiment, the carboxylic acid functions of the copolymer (P) are totally or partially neutralized by $Na^+$ only. That is to say, the carboxylic acid functions are preferably totally or partially neutralized by $Na^+$ in an amount from 80 to 100 mol-%. More preferably, the carboxylic acid functions of the copolymer (P) are totally or partially neutralized by $Na^+$ in an amount from 85 to 100 mol-%.

For example, the carboxylic acid functions of the copolymer (P) are partially neutralized by $Na^+$ in an amount from 85 to 95 mol-%. In this embodiment, the copolymer (P) thus contains free carboxylic acid functions in an amount from 5 to 15 mol-%. Preferably, the carboxylic acid functions of the copolymer (P) are partially neutralized by $Na^+$ in an amount from 88 to 92 mol-%, i.e. the copolymer (P) contains free carboxylic acid functions in an amount from 8 to 12 mol-%.

Alternatively, the carboxylic acid functions of the copolymer (P) are totally neutralized by $Na^+$, e.g. in an amount of 100 mol-%. In this embodiment, the copolymer (P) does not contain free carboxylic acid functions.

Preferably, 100% of the neutralized carboxylic acid functions of the copolymer (P) of step c) are neutralized by $Na^+$.

Additionally, it has been found out that the average molecular weight (Mw) of the at least one copolymer (P) must be in a very specific range. Most advantageously, the copolymer (P) has an average molecular weight (Mw) as measured by gel permeation chromatography (GPC) from 4 000 to 20 000 g/mol.

According to one embodiment, the at least one copolymer (P) provided in step c) has an average molecular weight (Mw) as measured by gel permeation chromatography (GPC) from 4 000 to 18 000 g/mol, preferably from 10 000 to 16 000 g/mol.

Additionally, it is required that the Polydispersity Index (PI) of the at least one copolymer (P) must be in a very specific range. Most advantageously, the copolymer (P) has a Polydispersity Index (PI) as measured by gel permeation chromatography (GPC) of between 1.5 and 4.0.

Preferably, the at least one copolymer (P) provided in step c) has a Polydispersity Index (PI) as measured by gel permeation chromatography (GPC) of between 1.5 and 3.8, preferably between 1.6 and 3.7, more preferably between 1.7 and 3.5, and most preferably between 1.8 and 3.3.

In one embodiment, the at least one copolymer (P) provided in step c) is thus a copolymer, wherein 100% of the neutralized carboxylic acid functions of the copolymer are neutralized by $Na^+$ and having
  i) an average molecular weight (Mw) as measured by gel permeation chromatography (GPC) from 4 000 to 20 000 g/mol, preferably from 4 000 to 18 000 g/mol, more preferably from 4 000 to 16 000 g/mol, and
  ii) a Polydispersity Index (PI) as measured by gel permeation chromatography (GPC) of between 1.5 and 4.0, preferably between 1.7 and 3.9.

The amount of the at least one copolymer (P) provided in step c) may be adjusted to the specific needs. If not otherwise indicated, the amount of the at least one copolymer (P) is based on the total dry weight of the calcium carbonate-comprising material provided in step b). According to the present invention, the amount of said at least one copolymer (P) provided in step c) preferably ranges from 500 to 5 000 ppm, based on the total dry weight of the calcium carbonate-comprising material. For example, the amount of said at least one copolymer (P) provided in step c) preferably ranges from 800 to 4 000 ppm, more preferably from 1 000 to 3 000 ppm, and most preferably from 1 200 to 2 000 ppm.

Unless specifically stated otherwise, the amount of the at least one copolymer (P) is to be understood as a total amount. In cases where said at least one copolymer (P) is added in one portion, the indicated amount thus refers to the amount of said one portion. Accordingly, in cases where the at least one copolymer (P) is added in more than one portions, the indicated amount thus refers to the total amount of said portions.

Process Step d)

According to step d) of the process according to the present invention, an aqueous suspension is formed by mixing the water of step a), the at least one calcium carbonate-comprising material of step b) and the at least one copolymer of step c).

In this respect, it is possible to obtain the aqueous suspension to be formed in step d) of the process according to the present invention by contacting with each other the components provided in steps a) to c) in any order.

According to one embodiment, the aqueous suspension to be formed in step d) is obtained by simultaneously mixing the water of step a), the at least one calcium carbonate-comprising material of step b) and the at least one copolymer of step c).

According to another embodiment, the aqueous suspension to be formed in step d) is obtained by mixing first the water of step a) with the at least one calcium carbonate-comprising material of step b) and then adding the at least one copolymer of step c) into the mixture.

According to still another embodiment, the aqueous suspension to be formed in step d) is obtained by mixing first the water of step a) with the at least one copolymer of step c) and then adding the at least one calcium carbonate-comprising material of step b) into the mixture.

According to a further embodiment, the aqueous suspension to be formed in step d) is obtained by mixing first the at least one copolymer of step c) with the at least one calcium carbonate-comprising material of step b) and then adding the water of step a) into the mixture.

It is preferred that the aqueous suspension to be formed in step d) is obtained by
  i. mixing simultaneously the water of step a), the at least one calcium carbonate-comprising material of step b) and the at least one copolymer of step c); or
  ii. mixing first the water of step a) with the at least one calcium carbonate-comprising material of step b) and then adding the at least one copolymer of step c) into the mixture; or
  iii. mixing first the water of step a) with the at least one copolymer of step c) and then adding the at least one calcium carbonate-comprising material of step b) into the mixture.

More preferably, the aqueous suspension to be formed in step d) is obtained by
  i. mixing simultaneously the water of step a), the at least one calcium carbonate-comprising material of step b) and the at least one copolymer of step c); or
  ii. mixing first the water of step a) with the at least one calcium carbonate-comprising material of step b) and then adding the at least one copolymer of step c) into the mixture.

The aqueous suspension of step d) may have any solids content that is suitable to be subjected to a wet grinding. However, in order to avoid excessive up-concentration and dewatering steps following the wet-grinding, it is advantageous that the aqueous suspension formed in step d) has a relatively high solids content. Thus, it is preferred that the aqueous suspension formed in step d) has a solids content in the range from 40 to 78 wt.-%, preferably from 50 to 70 wt.-%, based on the total weight of the aqueous suspension.

For the purposes of the process according to the present invention, process step d) is preferably carried out a temperature ranging from 2° C. to 60° C. It is preferred that step d) is carried out at room temperatures, i.e. at 23° C.±3° C.

Process Step e)

According to step e) of the process according to the present invention, the at least one calcium carbonate-comprising material in the aqueous suspension of step d) is wet ground in the presence of the at least one copolymer in at least one wet grinding step until the at least one calcium carbonate-comprising material has a weight median particle size $d_{50}$ from 0.1 µm to 3 µm as determined by the sedimentation method.

The term "wet grinding" in the meaning of the process according to the present invention refers to the comminution (e.g., in a ball mill, semi-autogenous mill, or autogenous mill) of solid material (e.g., of mineral origin) in the presence of water meaning that said material is in form of an aqueous slurry or suspension.

For the purposes of the present invention, any suitable mill known in the art may be used. However, said wet grinding step is preferably carried out in a ball mill. It has to be noted that step e) is carried out in at least one wet grinding step, i.e. it is also possible to use a series of grinding units which may, for example, be selected from ball mills, semi-autogenous mills, or autogenous mills.

The process according to the present invention is characterized in that wet grinding step e) is preferably carried out at high solids contents, i.e. at low total water contents, for example at a solids content in the range from 40 to 78 wt.-%, preferably from 50 to 70 wt.-%, based on the total weight of the aqueous suspension.

Additionally or alternatively, wet grinding step e) is preferably carried out in that the copolymer of step c) is present in an amount ranging from 500 to 5 000 ppm, based on the total dry weight of the calcium carbonate-comprising material. For example, wet grinding step e) is carried out in that the copolymer of step c) is present in an amount ranging from 800 to 4 000 ppm, based on the total dry weight of the calcium carbonate-comprising material, more preferably from 1 000 to 3 000 ppm, and most preferably from 1 200 to 2 000 ppm It is appreciated that wet grinding step e) can be carried out at room temperature or elevated temperatures. It is for example possible that the temperature of the aqueous suspension when starting step e) is of about room temperature, whereas the temperature may rise until the end of wet grinding step e). That is to say, it is preferred that the temperature during wet grinding step e) is not adjusted to a specific temperature.

Alternatively, the temperature during wet grinding step e) is held at a specific temperature by cooling the aqueous suspension.

For the purposes of the process according to the present invention, wet grinding step e) is preferably carried out at a temperature ranging from 10 to 150° C. According to another embodiment, the temperature in wet grinding step e)

ranges from 20 to 100° C., preferably from 20 to 90° C., and most preferably from 20 to 70° C.

It is appreciated that the wet ground calcium carbonate-comprising material obtained after grinding step e) has a weight median particle size $d_{50}$ ranging from 0.1 µm to 3 µm as determined by the sedimentation method.

Preferably, the calcium carbonate-comprising material in the aqueous suspension obtained in step e) has a weight median particle size $d_{50}$ from 0.1 µm to 2.8 µm, preferably from 0.4 µm to 2.6 µm, more preferably from 0.6 µm to 2.5 µm as determined by the sedimentation method.

Process Step f)

According to step f) of the process according to the present invention, the aqueous suspension obtained in step e) is up-concentrated or dewatered to achieve a higher solids content than that of step e) and the solids content achieved in step f) is at least 70 wt.-%, based on the total weight of the aqueous suspension.

The up-concentration or dewatering step f) in the process of the present invention is carried out by means known to the skilled person such as by mechanical- and/or thermal up-concentration or dewatering and/or combinations thereof.

Mechanical up-concentration or dewatering can be carried out by centrifugation or by filter pressing. Thermal up-concentration or dewatering can be carried out by methods such as solvent evaporation by heat or by flash-cooling.

Preferably, the up-concentration or dewatering in step f) is carried out by thermal up-concentration. In one embodiment, the thermal up-concentration is carried out in combination with vacuum.

In one embodiment, the up-concentration or dewatering in step f) is carried out such as to achieve a higher solids content than that of step e) and the solids content achieved in step f) is at least 72 wt.-%, preferably of at least 75 wt.-% and most preferably in the range from 75 to 81 wt.-%, based on the total weight of the aqueous suspension.

It is appreciated that the up-concentration or dewatering in step f) is carried out without a decrease in particle size of the calcium carbonate-comprising material present in the aqueous suspension. Thus, it is preferred that the wet ground calcium carbonate-comprising material obtained after the up-concentration or dewatering in step f) has a weight median particle size $d_{50}$ ranging from 0.1 µm to 3 µm as determined by the sedimentation method.

Preferably, the calcium carbonate-comprising material in the aqueous suspension obtained in step f) has a weight median particle size $d_{50}$ from 0.1 µm to 2.8 µm, preferably from 0.4 µm to 2.6 µm, more preferably from 0.6 µm to 2.5 µm as determined by the sedimentation method.

In any case, the up-concentration or dewatering in step f) is carried out in that the water content in the aqueous suspension obtained in step f) is below the water content in the aqueous suspension subjected to step f), i.e. in the aqueous suspension obtained in wet grinding step e).

It is appreciated that the up-concentration or dewatering in step f) is carried out separate from the wet-grinding in step e). Preferably, the up-concentration or dewatering in step f) is carried out after the wet-grinding in step e). More preferably, the up-concentration or dewatering in step f) is carried out after the wet-grinding in step e) has been completed. Thus, the up-concentration or dewatering in step f) is preferably carried out separate from and subsequent to the wet-grinding in step e).

Process Step g)

According to step g) of the process according to the present invention, the aqueous suspension obtained in step f) is dried to achieve a calcium carbonate-comprising material having a moisture content of 0.5 wt.-%, based on the total dry weight of the calcium carbonate-comprising material.

In said drying step g), the wet ground calcium carbonate-comprising material obtained in step f) is dried to obtain a dried calcium carbonate-comprising material.

In general, the drying step according to the process according to the present invention may be carried out by any drying method known to the skilled person. For example drying step g) can be carried out through drying means selected from the group comprising atomizing, spray drying, drying in a rotational oven, drying in a pond, jet-drying, fluid bed drying, freeze drying, fluidized spray drying, or fountain nozzle drying.

In one preferred embodiment, drying step g) is carried out by spray drying.

By means of drying step g), a dried calcium carbonate-comprising material is obtained having a low total moisture content which is less than or equal to 0.5 wt.-%, based on the total dry weight of said calcium carbonate-comprising material.

According to one embodiment, the dried calcium carbonate-comprising material obtained in step g) has a total moisture content of less than or equal to 0.4 wt.-% and preferably less than or equal to 0.2 wt.-%, based on the total dry weight of said dried calcium carbonate-comprising material.

For example, the dried calcium carbonate-comprising material obtained in step g) has a total moisture content of between 0.01 and 0.18 wt.-%, preferably between 0.02 and 0.15 wt.-%, and more preferably between 0.03 and 0.1 wt.-%, based on the total dry weight of said calcium carbonate-comprising material.

It is appreciated that drying step g) is carried out without a decrease in particle size of the calcium carbonate-comprising material. Thus, it is preferred that the dried calcium carbonate-comprising material obtained after drying step g) has a weight median particle size $d_{50}$ ranging from 0.1 µm to 3 µm as determined by the sedimentation method.

Preferably, the calcium carbonate-comprising material obtained in step g) has a weight median particle size $d_{50}$ from 0.1 µm to 2.8 µm, preferably from 0.4 µm to 2.6 µm, more preferably from 0.6 µm to 2.5 µm as determined by the sedimentation method.

In any case, the drying in step g) is carried out in that the moisture (or water) content in the material obtained in step g) is below the water content in the aqueous suspension subjected to step g), i.e. in the aqueous suspension obtained after the up-concentration or dewatering in step f).

It is appreciated that the drying in step g) is carried out separate from the up-concentration or dewatering in step f). Preferably, the drying in step g) is carried out after the up-concentration or dewatering in step f). More preferably, the drying in step g) is carried out after the up-concentration or dewatering in step f) has been completed. Thus, the drying in step g) is preferably carried out separate from and subsequent to the up-concentration or dewatering in step f).

Process Step h)

According to step h) of the process according to the present invention, the calcium carbonate-comprising material obtained in step g) is surface treated with at least one hydrophobizing agent.

By means of such surface treatment step, a treatment layer is formed on at least a part of the surface of the obtained calcium carbonate-comprising material.

The hydrophobizing agent used in treatment step h) may be any agent known to the skilled person which is capable to form a hydrophobic treatment layer on at least part of the surface of a calcium carbonate-comprising material.

In one embodiment, the hydrophobizing agent of step g) is selected from the group consisting of aliphatic carboxylic acids having a total amount of carbon atoms from 4 to 24 chain carbon atoms, mono-substituted succinic anhydrides, phosphoric acid ester blends, polyhydrogensiloxanes, aliphatic aldehydes having 6 to 14 carbon atoms, and mixtures thereof.

According to one embodiment of the present invention, the hydrophobizing agent of step h) is a saturated aliphatic carboxylic acid having a total amount of carbon atoms from C4 to C24.

The aliphatic carboxylic acid in the meaning of the present invention may be selected from one or more linear chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of octanoic acid, myristic acid, palmitic acid, stearic acid and mixtures thereof.

For example, the aliphatic carboxylic acid is octanoic acid or stearic acid. Preferably, the aliphatic carboxylic acid is stearic acid.

According to another embodiment of the present invention, the hydrophobizing agent of step h) is a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent.

Methods for preparing a surface treated calcium carbonate-comprising material treated with a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and suitable compounds for coating are described e.g. in WO2016023937 A1, which is thus incorporated herewith by reference.

According to another embodiment of the present invention, the hydrophobizing agent of step h) is a phosphoric acid ester blend of one or more phosphoric acid mono-ester and one or more phosphoric acid di-ester.

Methods for preparing a surface treated calcium carbonate-comprising material treated with at least one phosphoric acid ester blend and suitable compounds for coating are described e.g. in EP2770017 A1, which is thus incorporated herewith by reference.

According to another embodiment of the present invention, the hydrophobizing agent of step h) is a polyhydrogensiloxane, an inert silicone oil, preferably polydimethylsiloxane, and mixtures thereof.

According to another embodiment of the present invention, the hydrophobizing agent of step h) is an aliphatic aldehyde selected from aliphatic aldehydes having 6 to 14 carbon atoms. Preferably, an aliphatic aldehyde selected from aliphatic aldehydes having 6 to 12 carbon atoms and more preferably from aliphatic aldehydes having 8 or 9 carbon atoms. In a preferred embodiment, the aliphatic aldehyde is selected from the group consisting of hexanal, heptanal, octanal, nonanal, decanal, undecanal, dodecanal, tridecanal, butadecanal and mixtures thereof.

Methods for preparing a surface treated calcium carbonate-comprising material treated with at least one aliphatic aldehyde and suitable compounds for coating are described e.g. in EP2390285 A1, which is thus incorporated herewith by reference.

It is appreciated that the surface treated calcium carbonate-comprising material obtained in process step h) of the present invention further comprises reaction products of the hydrophobizing agent used.

The term "reaction products" in the meaning of the present invention refers to products obtained by contacting the surface of the calcium carbonate-comprising material with the at least one hydrophobizing agent. Said reaction products are formed between the applied at least one hydrophobizing agent and reactive molecules located at the surface of the calcium carbonate-comprising material. The surface treatment of a calcium carbonate-comprising material is well known to the skilled person. Thus, the skilled person is also well aware of the reaction products that may be formed by such a reaction such that there is no need to define the reaction products that may be formed on the surface of the calcium carbonate-comprising material in more detail in the present application.

In one embodiments of the process according to the present invention, the temperature in surface treatment step h) ranges from 70° C. to 140° C., preferably from 75° C. to 130° C., and more preferably from 80° C. to 125° C.

In some cases, the surface treatment step h) may be carried out directly at the end of the drying step g).

Also the final surface treated calcium carbonate-comprising material obtained after surface treatment step h) has a low total moisture content.

Therefore, according to one embodiment, said surface treated calcium carbonate-comprising material has a total moisture content of less than or equal to 0.5 wt.-%, preferably of less than or equal to 0.4 wt.-% and most preferably less than or equal to 0.2 wt.-%, based on the total dry weight of said surface treated calcium carbonate-comprising material.

For example, the surface treated calcium carbonate-comprising material obtained in step h) has a total moisture content of between 0.01 and 0.15 wt.-%, preferably between 0.02 and 0.10 wt.-%, and more preferably between 0.03 and 0.07 wt.-%, based on the total dry weight of said surface treated calcium carbonate-comprising material.

Furthermore, the surface treated calcium carbonate-comprising material obtained in step h) preferably has a moisture pick-up equal or inferior to 0.26 mg/m$^2$, preferably equal or inferior to 0.21 mg/m$^2$, at a temperature of 23° C. (±2° C.).

It is appreciated that surface treatment step h) is carried out without a decrease in particle size of the calcium carbonate-comprising material. Thus, it is preferred that the surface treated calcium carbonate-comprising material obtained after step h) has a weight median particle size $d_{50}$ ranging from 0.1 µm to 3 µm as determined by the sedimentation method.

Preferably, the surface treated calcium carbonate-comprising material obtained in step h) has a weight median particle size $d_{50}$ from 0.1 µm to 2.8 µm, preferably from 0.4 µm to 2.6 µm, more preferably from 0.6 µm to 2.5 µm as determined by the sedimentation method.

Articles and Uses

The inventors surprisingly found out that by the process of the present invention, a surface treated calcium carbonate-comprising material can be obtained that is sufficiently hydrophobic for applications in polymer compositions and has a low moisture pick up susceptibility such that it is lower than that of the same material prepared by the same process using a grinding aid agent of the prior art. That is to say, the surface treated calcium carbonate-comprising material obtained obtained by the process of the present invention is especially suitable for the use in a polymer composition, in particular polyolefin polymer composition.

Thus, the present invention refers in another aspect to a surface treated calcium carbonate-comprising material comprising a treatment layer on the surface of the mineral material comprising the at least one hydrophobizing agent and reaction products thereof. It is appreciated that the surface treated calcium carbonate-comprising material is obtained by the process of the present invention. That is to say, the surface treated calcium carbonate-comprising material is obtained by the process for preparing a surface treated calcium carbonate-comprising material comprising process steps a), b), c), d), e), f), g) and h).

With regard to the definition of the surface treated calcium carbonate-comprising material, and preferred embodiments thereof, reference is made to the comments provided above when discussing process steps a), b), c), d), e), f), g) and h).

In this respect, the surface treated calcium carbonate-comprising material according to the present invention preferably has a moisture pick up susceptibility equal or inferior to 0.26 mg/m², preferably equal or inferior to 0.21 mg/m², at a temperature of 23° C. (±2° C.).

It is preferred that the surface treated calcium carbonate-comprising material is in form of a powder.

In a further aspect, the present invention refers to an article comprising the surface treated calcium carbonate-comprising material.

The article preferably comprises the surface treated calcium carbonate-comprising material in an amount from 1 to 90 wt.-% preferably from 3 to 70 wt.-%, still more preferably from 6 wt.-% to 65 wt.-%, and still more preferably from 7 to 60 wt.-%, based on the total weight of the article.

It is appreciated that the article is preferably a polyolefin polymer product.

Accordingly, the polymer product comprises at least one polymeric resin. The polymeric resin represents the backbone of the product and provides strength, flexibility, toughness and durability.

In one embodiment of the present invention, the at least one polymeric resin is at least one thermoplastic polymer. Thus, it is preferred that the at least one polymeric resin is selected from the group comprising homopolymers and/or copolymers of polyolefins, polyamides, halogen-containing polymers and/or polyesters. Most preferably, the at least one polymeric resin is a homopolymer and/or copolymer of a polyolefin. For example, the at least one polymeric resin is a homopolymer and a copolymer of a polyolefin. Alternatively, the at least one polymeric resin is a homopolymer or a copolymer of a polyolefin.

It is appreciated that the at least one polymeric resin is preferably a homopolymer of a polyolefin.

For example, the polyolefin can be polyethylene and/or polypropylene and/or polybutylene. Accordingly, if the polyolefin is polyethylene, the polyolefin is selected from the group comprising homopolymers and/or copolymers of polyethylene like high-density polyethylene (HDPE), medium-density polyethylene (MDPE), low-density polyethylene (LDPE), very low-density polyethylene (VLDPE), linear low-density polyethylene (LLDPE).

For example, the polyolefin is a homopolymer and/or copolymer of polyethylene.

The expression homopolymer of polyethylene used in the present invention relates to polyethylene comprising a polyethylene that consists substantially, i.e. of more than 99.7 wt.-%, still more preferably of at least 99.8 wt.-%, based on the total weight of the polyethylene, of ethylene monomer units. For example, only ethylene monomer units in the homopolymer of polyethylene are detectable.

In case the at least one polymeric resin comprises a copolymer of polyethylene, it is appreciated that the polyethylene contains monomer units derivable from ethylene as major components. Accordingly, the copolymer of polyethylene comprises at least 55 wt.-% monomer units derivable from ethylene, more preferably at least 60 wt.-% of monomer units derived from ethylene, based on the total weight of the polyethylene. For example, the copolymer of polyethylene comprises 60 to 99.5 wt.-%, more preferably 90 to 99 wt.-%, monomer units derivable from ethylene, based on the total weight of the polyethylene. The comonomers present in such copolymer of polyethylene are C3 to C10 α-olefins, preferably 1-butene, 1-hexene and 1-octene, the latter especially preferred.

Additionally or alternatively, the polyolefin is a homopolymer and/or copolymer of polypropylene.

The expression homopolymer of polypropylene as used throughout the instant invention relates to a polypropylene that consists substantially, i.e. of more than 99 wt.-%, still more preferably of at least 99.5 wt.-%, like of at least 99.8 wt.-%, based on the total weight of the polypropylene, of propylene monomer units. In a preferred embodiment only propylene monomer units are detectable in the homopolymer of polypropylene.

In case the at least one polymeric resin is a copolymer of polypropylene, the polypropylene preferably contains monomer units derivable from propylene as major components. The copolymer of polypropylene preferably comprises, preferably consists of, monomer units derived from propylene and C2 and/or at least one C4 to C10 α-olefin. In one embodiment of the present invention, the copolymer of polypropylene comprises, preferably consists of, monomer units derived from propylene and at least one α-olefin selected from the group consisting of ethylene, 1-butene, 1-pentene, 1-hexene and 1-octene. For example, the copolymer of polypropylene comprises, preferably consists of, monomer units derived from propylene and ethylene. In one embodiment of the present invention, the monomer units derivable from propylene constitutes the main part of the polypropylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polypropylene. The amount of monomer units derived from C2 and/or at least one C4 to C10 α-olefin in the copolymer of polypropylene, is in the range of 1 to 40 wt.-%, more preferably in the range of 1 to 30 wt.-% and most preferably in the range of 1 to 20 wt.-%, based on the total weight of the copolymer of polypropylene.

If the copolymer of polypropylene comprises only monomer units derivable from propylene and ethylene, the amount of ethylene is preferably in the range of 1 to 20 wt.-%, preferably in the range of 1 to 15 wt.-% and most preferably in the range of 1 to 10 wt.-%, based on the total weight of the copolymer of polypropylene. Accordingly, the amount of propylene is preferably in the range of 80 to 99 wt.-%, preferably in the range of 85 to 99 wt.-% and most preferably in the range of 90 to 99 wt.-%, based on the total weight of the copolymer of polypropylene.

Additionally or alternatively, the polyolefin is a homopolymer and/or copolymer of polybutylene.

The expression homopolymer of polybutylene as used throughout the instant invention relates to a polybutylene that consists substantially, i.e. of more than 99 wt.-%, still more preferably of at least 99.5 wt.-%, like of at least 99.8 wt.-%, based on the total weight of the polybutylene, of butylene monomer units. In a preferred embodiment only butylene monomer units are detectable in the homopolymer of polybutylene.

In case the at least one polymeric resin is a copolymer of polybutylene, the polybutylene preferably contains monomer units derivable from butylene as major components. The copolymer of polybutylene preferably comprises, preferably consists of, monomer units derived from butylene and C2 and/or C3 and/or at least one C5 to C10 α-olefin. In one embodiment of the present invention, the copolymer of polybutylene comprises, preferably consists of, monomer units derived from butylene and at least one α-olefin selected from the group consisting of ethylene, 1-propene, 1-pentene, 1-hexene and 1-octene. For example, the copolymer of polybutylene comprises, preferably consists of, monomer units derived from butylene and ethylene. In one embodiment of the present invention, the monomer units derivable from butylene constitutes the main part of the polybutylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polybutylene. The amount of monomer units derived from C2 and/or C3 and/or at least one C5 to C10 α-olefin in the copolymer of polybutylene, is in the range of 1 to 40 wt.-%, more preferably in the range of 1 to 30 wt.-% and most preferably in the range of 1 to 20 wt.-%, based on the total weight of the copolymer of polybutylene.

In one embodiment of the present invention, the at least one polymeric resin is a homopolymer of polyethylene and/or polypropylene and/or polybutylene. For example, the at least one polymeric resin is a homopolymer of polyethylene and polypropylene. Alternatively, the at least one polymeric resin is a homopolymer of polyethylene or polypropylene. In one embodiment of the present invention, the at least one polymeric resin is a homopolymer of polypropylene.

The expression "at least one" polymeric resin means that one or more kinds of polymeric resin may be present in the inventive article, preferably polyolefin polymer product.

Accordingly, it is appreciated that the at least one polymeric resin may be a mixture of two or more kinds of polymeric resins. For example, if the at least one polymeric resin is a mixture of two or more polymeric resins, one polymeric resin is a homopolymer or copolymer of polypropylene, while the second or further polymeric resin is selected from the group comprising homopolymers and/or copolymers of polyethylene, polybutylene, polyamides, polyesters, halogen-containing polymers and mixtures thereof.

In one embodiment of the present invention, the at least one polymeric resin is one kind of polymeric resin. Preferably, the at least one polymeric resin is a homopolymer of polyethylene or polypropylene.

According to one aspect of the present invention, a polymer composition is provided comprising the surface treated calcium carbonate-comprising material in an amount of from 50 to 85 wt.-%, preferably from 60 to 85 wt.-% and more preferably from 70 to 80 wt.-%, based on the total weight of the polymer composition.

Preferably, the polymer composition is a masterbatch.

The term "masterbatch" refers to a composition having a concentration of the surface treated calcium carbonate-comprising material that is higher than the concentration of the polymer composition used for preparing the final article, such as the polyolefin polymer product. That is to say, the masterbatch is further diluted such as to obtain a polymer composition which is suitable for preparing the final article, such as the polyolefin polymer product.

In view of the excellent results, the present invention refers in a further aspect to the use of the surface treated calcium carbonate-comprising material in a polymer composition, in particular polyolefin polymer composition.

Thus, the present invention refers in a further aspect to the use of the surface treated calcium carbonate-comprising material in polyolefin polymer applications.

The scope and interest of the invention will be better understood based on the following examples which are intended to illustrate certain embodiments of the present invention and are non-limitative.

EXAMPLES

A. Measurement Methods

The following measurement methods are used to evaluate the parameters given in the examples and claims.

pH Measurement

Any pH value was measured at 25° C. using a Mettler-Toledo Seven Easy pH meter and a Mettler-Toledo InLab Expert Pro pH electrode. A three point calibration (according to the segment method) of the instrument was first made using commercially available buffer solutions having pH values of 4, 7 and 10 at 25° C. (from Aldrich). The reported pH values were the endpoint values detected by the instrument (signal differs by less than 0.1 mV from the average over the last 6 seconds).

Conductivity Measurement

Conductivity of a suspension was measured at 25° C. (+/−1° C.) using Mettler Toledo Seven Multi instrumentation equipped with the corresponding Mettler Toledo conductivity expansion unit and a Mettler Toledo InLab 731 conductivity probe, directly following stirring the suspension at 1500 rpm using a Pendraulik tooth disc stirrer. The instrument was first calibrated in the relevant conductivity range using commercially available conductivity calibration solutions from Mettler Toledo. The influence of temperature on conductivity was automatically corrected by the linear correction mode. Measured conductivities were reported for the reference temperature of 20° C. The reported conductivity values were the endpoint values detected by the instrument (the endpoint is when the measured conductivity differs by less than 0.4% from the average over the last 6 seconds).

Particle Size Distribution and Weight Median Grain Diameter

Particle size distribution (mass % particles with a diameter<X) and weight median grain diameter ($d_{50}$) of particulate materials were determined via the sedimentation method, i.e. an analysis of sedimentation behaviour in a gravimetric field. The measurement was made with a Sedigraph™ 5100 at 25° C. (+/−1° C.). The method and the instrument are known to the skilled person and are commonly used to determine grain size of fillers and minerals. The measurement was carried out in an aqueous solution of 0.1% by weight of $Na_4P_2O_7$. The samples were dispersed using a high speed stirrer and ultrasonic.

Viscosity Measurement

Brookfield viscosity was measured after 1 minute (if no other indication) of stirring by the use of a RVT model Brookfield™ viscometer at room temperature and a rotation speed of 100 rpm (revolutions per minute) with the appropriate disc spindle 2, 3 or 4. Without further indication the viscosity was measured at 25° C. (+/−1° C.).

Weight Solids (% by Weight) of a Material in Suspension

Weight solids was determined by dividing the weight of the solid material by the total weight of the aqueous suspension. The weight of the solid material was determined by weighing the solid material obtained by evaporating the aqueous phase of suspension and drying the obtained material to a constant weight.

Moisture Pick Up Susceptibility

The moisture pick up susceptibility of a material as referred to herein was determined in mg moisture/g after exposure to an atmosphere of 10 and 85% relative humidity, respectively, for 2.5 hours at a temperature of +23° C. (±2° C.). For this purpose, the sample was first kept at an atmosphere of 10% relative humidity for 2.5 hours, then the atmosphere was changed to 85% relative humidity at which the sample was kept for another 2.5 hours. The weight increase between 10 and 85% relative humidity was then used to calculate the moisture pick-up in mg moisture/g of sample.

Humidity (Moisture Content) of Calcium Carbonate

A 10 g powder sample was heated in an oven at 150° C. (+/−1° C.) until the mass was constant for 20 minutes. The mass loss was determined gravimetrically and is expressed as wt.-% loss based on the initial sample mass. This mass loss was attributed to the sample humidity.

Average Molecular Weight (Mw) and Polydispersity (PI)

A test portion of the polymer solution corresponding to 90 mg of dry matter was introduced into a 10 ml flask. Mobile phase, with an additional 0.04 wt. % of dimethylformamide, is added, until a total mass of 10 g was reached. The composition of this mobile phase at pH 9 was as follows: $NaHCO_3$: 0.05 mol/l, $NaNO_3$: 0.1 mol/l, triethanolamine: 0.02 mol/l, 0.03 wt. % of $NaN_3$.

The gel permeation chromatography (GPC) equipment was equipped with an isocratic pump of the Waters™ 515 type, the flow rate was set to 0.8 ml/min., a Waters™ 717+ sample changer, a kiln containing a precolumn of the "Guard Column Ultrahydrogel Waters™" type which was 6 cm in length and had an internal diameter of 40 mm, followed by a linear column of the "Ultrahydrogel Waters™" type which was 30 cm in length and had an internal diameter of 7.8 mm.

Detection was accomplished by means of a Waters™ 410 type differential refractometer. The kiln was heated to a temperature of 60° C. and the refractometer was heated to a temperature of 45° C.

The GPC equipment was calibrated with a series of powders of sodium polyacrylate standards supplied and certified by Polymer Standard Service or American Polymers Standards Corporation. (maximum ($M_P$) molecular weight of between 900 and $2.25 \times 10^6$ g/mol and a polydispersity index of between 1.4 and 1.8).

The calibration graph was of the linear type and took account of the correction obtained using the flow rate marker (dimethylformamide).

Acquisition and processing of the chromatogram were accomplished through use of the PSS WinGPC Scientific v. 4.02 application. The chromatogram obtained was incorporated in the area corresponding to molecular weights higher than 200 g/mol.

B. Materials Used

Calcium Carbonate-Comprising Material A

Natural $CaCO_3$ marble from Italy, Avenza, having a $d_{90}$ value of 50 μm, a $d_{50}$ value of 10 μm, and a $d_{20}$ value of 2 μm.

Grinding Aid Agents

The grinding aid agents used are set out in the following table 1.

TABLE 1

Grinding aid agents used

| Grinding aid agent | Composition | M [g/mol] | PI (Mw/Mn) | Neutralization [mol %] |
|---|---|---|---|---|
| A (inventive) | Acrylic acid/ hydroxpropyl acrylate copolymer (74/26 molar) | 14 110 | 3.8 | 100% $Na^+$ |
| B (inventive) | Acrylic acid/ethyl acrylate copolymer (88/12 molar) | 4 925 | 2.2 | 100% $Na^+$ |
| C (comparative) | Acrylic acid/ hydroxypropyl acrylate copolymer (74/26 molar) | 2 000 | 7.5 | 100% $NH_4^+$ |
| D (comparative) | Acrylic acid homopolymer | 6 000 | 2.6 | 70% $Na^+$, 30% $Ca^{2+}$ |

C. Test Results

2. Trials 1 to 4

Preparation of Pigment Particles Suspension

An aqueous suspension having solids content of 71 wt.-% (+/−1 wt.-%), based on the total weight of the suspension, was prepared by mixing tap water with 1 500 ppm of the respective grinding aid agent set out in table 2 and the calcium carbonate-comprising material A using a Ystral mixer (Dispermix, Ystral GmbH, Germany). Subsequently, the obtained mixture was wet ground in a 200-litre vertical attritor mill using zircon silicate beads of 0.6 to 1.0 mm diameter. The slurry temperature at the mill inlet was 20° C. and at the outlet between 50 and 70° C. The mill parameters where adjusted in order to reach a particle size distribution of at least 45%<2 μm.

The results are summarized in table 2 below.

TABLE 2

Wet grinding of a calcium carbonate-comprising material suspension with various grinding aid agents

| Trial | Grinding aid agent | Grinding aid agent quantity [ppm] | Slurry solids [wt.-%] | Slurry Viscosity [mPa · s] | PSD % <2 µm | PSD % <1 µm | pH |
|---|---|---|---|---|---|---|---|
| 1 (inventive) | A | 1 500 | 71.5 | 310 | 45.6 | 27.1 | 9.3 |
| 2 (inventive) | B | 1 500 | 71.4 | 102 | 47.1 | 28.3 | 9.4 |
| 3 (comparative) | D | 1 500 | 71.5 | 237 | 46.7 | 27.0 | 9.0 |
| 4 (comparative) | C | 1 500 | 71.5 | >1 000 (not possible to grind) | N/A | N/A | N/A |

In a subsequent stage, the suspensions were up-concentrated using a thermal pilot evaporator from EPCON™ brand. The evaporator was operated at a suspension temperature of 95° C. Samples were taken at different solids contents and the viscosity was measured after cooling down of the suspension to 25° C. The target was to identify the solids content corresponding to a viscosity (at 25° C.) of approximately 500 mPa·s. The results are shown in table 3 below.

TABLE 3 thermal up-concentration-viscosity at different solids concentrations

| Trial | Solids [wt.-%] | Viscosity [mPa · s] at 25° C. |
|---|---|---|
| Suspension based on 1 (inventive) | 74.9 | 537 |
|  | 75.8 | 882 |
|  | 77 | 1 170 |
|  | 77.8 | 1 416 |
| Suspension based on 2 (inventive) | 76.3 | 324 |
|  | 76.7 | 406 |
|  | 77.4 | 463 |
|  | 77.7 | 558 |
| Suspension based on 3 (comparative) | 76.9 | 3 112 |

From table 3, it can be gathered that the viscosity of the aqueous suspensions prepared by using the inventive grinding aid agents is lower compared to a comparative suspension based on another copolymer as grinding aid agent. Furthermore, it is to be noted that the comparative polymer C (see trial 4 in table 2) even did not allow grinding the mineral material.

The suspensions set out in table 3 were subsequently spray dried on a Niro drier operating at an atomizer speed of 16 680 rpm. The burner temperature was 400° C. and the tower temperature was 130° C.

Each of the dried calcium carbonate-comprising materials was subsequently surface treated with 1.2 wt.-% of stearic acid in a Laboratory mixer (Somakon MP-LB Mixer, Somakon Verfahrenstechnik, Germany). The dry calcium carbonate-comprising materials were activated for 10 min at 120° C. and 2 000 rpm. Subsequently, the surface treatment agent was added and the corresponding blends were further mixed at 120° C. under a stirring speed of 2 000 rpm for a period of 10 min.

The results for the moisture pick-up susceptibility are set out in table 4 below.

TABLE 4 moisture pick-up of surface treated calcium carbonate-comprising materials

| Trial | Grinding aid agent | Grinding aid agent quantity [ppm] | moisture pick up susceptibility-after treatment [mg/m$^2$] |
|---|---|---|---|
| based on suspension 1 (inventive) | A | 1 500 | 0.19 |
| based on Suspension 2 (inventive) | B | 1 500 | 0.21 |
| based on Suspension 3 (comparative) | D | 1 500 | 0.27 |

From table 4, it can be gathered that both inventive grinding aid agents A and B lead to a lower moisture pick-up susceptibility of the final surface treated calcium carbonate-comprising material compared to a surface treated material prepared by using the same amount of a grinding aid agent based on a homopolymer.

The invention claimed is:

1. A process for preparing a surface treated calcium carbonate-comprising material for use in polymer applications comprising the steps of:
    a) providing water;
    b) providing at least one calcium carbonate-comprising material;
    c) providing at least one copolymer (P) used as grinding aid agent prepared from the polymerisation reaction of
        at least one compound selected from the group consisting of acrylic acid, methacrylic acid, salts thereof, and combinations thereof, and
        at least one non-ionic compound selected from the group consisting of hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof,
    one or more of the least one copolymer (P) having
        i) an average molecular weight (Mw) as measured by gel permeation chromatography (GPC) from 4 000 to 20 000 g/mol, and
        ii) a Polydispersity Index (PI) as measured by gel permeation chromatography (GPC) of between 1.5 and 4.0, and
        iii) carboxylic acid functions that are totally or partially neutralized (A) by $Na^+$ in an amount of 70 mol-% and (B) by $Na^+$, $K^+$, $Li^+$ or combinations thereof in an additional amount from 10 to 30 mol-%;
    d) forming an aqueous suspension by mixing the water of step a), the at least one calcium carbonate comprising material of step b) and the at least one copolymer (P) of step c);
    e) wet grinding the at least one calcium carbonate-comprising material in the aqueous suspension of step d) in the presence of the at least one copolymer (P) in at least one wet grinding step until the at least one calcium carbonate-comprising material has a weight median particle size $d_{50}$ from 0.1 µm to 3 µm as determined by the sedimentation method; and f) up-concentrating or dewatering the aqueous suspension obtained in step e) to achieve a higher solids content than that of step e) and the solids content achieved in step f) is at least 70 wt.-%, based on the total weight of the aqueous suspension; and g) drying the aqueous suspension obtained in step f) to achieve a calcium carbonate-comprising material having a moisture content of ≤0.5 wt.-%, based on the total dry weight of the calcium carbonate-comprising material; and h) surface treating the calcium carbonate-comprising material obtained in step g) with at least one hydrophobizing agent.

2. The process according to claim 1, wherein step d) of forming an aqueous suspension is carried out by i. mixing simultaneously the water of step a), the at least one calcium carbonate comprising material of step b) and the at least one copolymer (P) of step c); or ii. mixing first the water of step a) with the at least one calcium carbonate comprising material of step b) and then adding the at least one copolymer (P) of step c) into the mixture; or iii. mixing first the water of step a) with the at least one copolymer (P) of step c) and then adding the at least one calcium carbonate comprising material of step b) into the mixture; or iv. mixing first the at least one copolymer (P) of step c) with the at least one calcium carbonate comprising material of step b) and then adding the water of step a) into the mixture.

3. The process according to claim 1, wherein the aqueous suspension of step d) and/or e) has a solids content in the range from 40 to 78 wt.-%, based on the total weight of the aqueous suspension.

4. The process according to claim 1, wherein 100% of the neutralized carboxylic acid functions of one or more of the at least one copolymer (P) of step c) are neutralized by $Na^+$.

5. The process according to claim 1, wherein one or more of the at least one copolymer (P) of step c) has an average molecular weight (Mw) from 4 000 to 18 000 g/mol, as measured by gel permeation chromatography (GPC).

6. The process according to claim 1, wherein the wet grinding step e) is carried out in that the at least one copolymer (P) of step c) is present in an amount ranging from 500 to 5 000 ppm, based on the total dry weight of the calcium carbonate-comprising material.

7. The process according to claim 1, wherein the up-concentration or dewatering in step f) is carried out such as to achieve a solids content of at least 72 wt.-%, based on the total weight of the aqueous suspension.

8. The process according to claim 1, wherein the up-concentration or dewatering in step f) is carried out by mechanical- and/or thermal up-concentration and/or combinations thereof, optionally in combination with a vacuum.

9. The process according to claim 1, wherein the calcium carbonate-comprising material in the aqueous suspension obtained in step e) and/or step f) and/or step g) and/or step h) has a weight median particle size $d_{50}$ from 0.1 µm to 2.8 µm, as determined by the sedimentation method.

10. The process according to claim 1, wherein the hydrophobizing agent is

I) an aliphatic carboxylic acid having a total amount of carbon atoms from $C_4$ to $C_{24}$, or II) a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, or III) a phosphoric acid ester blend of one or more phosphoric acid mono-ester and one or more phosphoric acid di-ester, or IV) polyhydrogensiloxane and reaction products thereof, an inert silicone oil, polydimethylsiloxane, and mixtures thereof, or V) an aliphatic aldehyde selected from aliphatic aldehydes having 6 to 14 carbon atoms.

11. The process according to claim 1, wherein the surface treated calcium carbonate-comprising material has a moisture pick-up equal to or less than 0.26 mg/m², at a temperature of 23° C. (±2° C.).

12. A surface treated calcium carbonate-comprising material as obtained by the process according to claim 1 comprising a treatment layer on the surface of the calcium carbonate-comprising material comprising the at least one hydrophobizing agent and reaction products thereof.

13. An article comprising the surface treated calcium carbonate-comprising material according to claim 12.

14. The article according to claim 13, wherein the surface treated calcium carbonate-comprising material is present in an amount from 1 to 90 wt.-%.

15. A polymer composition comprising the surface treated calcium carbonate-comprising material according to claim 12 in an amount of from 50 to 85 wt.-%, based on the total weight of the polymer composition.

16. The process according to claim 1, wherein the drying is performed by atomizing, spray drying, drying in a rotational oven, drying in a pond, jet-drying, fluid bed drying, freeze drying, fluidized spray drying, or fountain nozzle drying.

17. The process according to claim 1, wherein the aqueous suspension of step d) and/or e) has a solids content in the range from 50 to 70 wt.-%, based on the total weight of the aqueous suspension.

18. The process according to claim 1, wherein one or more of the at least one copolymer (P) of step c) has an average molecular weight (Mw) from 10 000 to 16 000 g/mol, as measured by gel permeation chromatography (GPC).

19. The process according to claim 1, wherein the wet grinding step e) is carried out in that the at least one copolymer (P) of step c) is present in an amount ranging from 1 200 to 2 000 ppm, based on the total dry weight of the calcium carbonate-comprising material.

20. The process according to claim 1, wherein the up-concentration or dewatering in step f) is carried out such as to achieve a solids content from 75 to 81 wt.-%, based on the total weight of the aqueous suspension.

21. The process according to claim 1, wherein the calcium carbonate-comprising material in the aqueous suspension obtained in step e) and/or step f) and/or step g) and/or step h) has a weight median particle size $d_{50}$ from 0.6 µm to 2.5 µm, as determined by the sedimentation method.

22. The process according to claim 1, wherein the surface treated calcium carbonate-comprising material has a moisture pick-up equal to or less than 0.21 mg/m², at a temperature of 23° C. (±2° C.).

23. The article according to claim 13, wherein the article is a polyolefin polymer product.

24. The article according to claim 13, wherein the surface treated calcium carbonate-comprising material is present in an amount from 7 to 60 wt.-%.

25. The polymer composition according to claim 15, wherein the polymer composition is a masterbatch.

26. The polymer composition according to claim 15, wherein the surface treated calcium carbonate-comprising material is in an amount from 70 to 80 wt.-%, based on the total weight of the polymer composition.

\* \* \* \* \*